(12) United States Patent
Zhang et al.

(10) Patent No.: US 7,800,027 B2
(45) Date of Patent: Sep. 21, 2010

(54) METHOD OF WATER TEMPERATURE CALIBRATION FOR ELECTRIC KETTLE

(76) Inventors: Mohan Zhang, Block 9, Tongfuyu Industrial Zone, Tanglang, Xili, Nanshan, Shenzhen (CN); Yaolun Wang, Block 9, Tongfuyu Industrial Zone, Tanglang, Xili, Nanshan, Shenzhen (CN)

( * ) Notice: Subject to any disclaimer, the term of this patent is extended or adjusted under 35 U.S.C. 154(b) by 322 days.

(21) Appl. No.: 11/632,098

(22) PCT Filed: Sep. 10, 2005

(86) PCT No.: PCT/CN2005/001455

§ 371 (c)(1),
(2), (4) Date: Jan. 9, 2007

(87) PCT Pub. No.: WO2007/028282

PCT Pub. Date: Mar. 15, 2007

(65) Prior Publication Data

US 2008/0302780 A1     Dec. 11, 2008

(51) Int. Cl.
*H05B 1/02* (2006.01)
(52) U.S. Cl. .............. 219/494; 219/497; 219/441; 219/492; 392/340; 340/589
(58) Field of Classification Search .......... 219/494, 219/492, 497, 499, 501, 505, 506–508, 441; 392/324, 342; 340/588, 589
See application file for complete search history.

(56) References Cited

U.S. PATENT DOCUMENTS

| | | | | |
|---|---|---|---|---|
| 5,324,917 | A * | 6/1994 | Boyer et al. | 219/497 |
| 6,118,105 | A * | 9/2000 | Berkcan et al. | 219/497 |
| 6,155,159 | A * | 12/2000 | Bizard | 99/330 |
| 7,279,660 | B2 * | 10/2007 | Long et al. | 219/441 |

* cited by examiner

*Primary Examiner*—Mark H Paschall
(74) *Attorney, Agent, or Firm*—Raymond Y. Chan; David and Raymond Patent Firm

(57) ABSTRACT

A water temperature calibration method for an electric kettle includes the steps of providing a temperature sensor, a microprocessor, and a control circuit; detecting an interior temperature from one of the temperatures of the water, a heating point contacting with the water, and an interior wall of the electric kettle; determining a temperature rate change by the microprocessor and comparing a current cycle of the temperature rate change with a previous cycle thereof; and sending out a control signal to the control circuit when the current cycle of the temperature rate change is close to the previous cycle thereof that a difference between the current cycle of the temperature rate change and the previous cycle thereof is minimized. Therefore, the process is adapted to accurately determine the water temperature and to cut off the heating power when the water is boiled.

20 Claims, No Drawings

METHOD OF WATER TEMPERATURE CALIBRATION FOR ELECTRIC KETTLE

BACKGROUND OF THE PRESENT INVENTION

1. Field of Invention

The present invention relates to an electric kettle, and more particularly to a method of water temperature calibration for an electric kettle, which is adapted to accurately determine the temperature of the boiling water in the electric kettle and to cut off the heating power when the water is boiled.

2. Description of Related Arts

The electric kettle has brought many conveniences for people in their living and work. The traditional method for electric kettle to determine and control the boiling water is to apply a "steam" switch made of dual metal materials to switch off the power of the heating source. Accordingly, the amount of steam generated by the boiling water must be enough to trigger the switch so as to cut off the power. In order to guide the steam to communicate with the switch, a steam channel must be additionally formed to let the steam entering into the switch. Therefore, the switch not only complicates the original structural configuration of the electric kettle but also fails to keep the aesthetic appearance of the electric kettle. Importantly, the switch is not sensitive enough to detect the water at the boiling point to cut off the power simultaneously. An alternative calibrating method is to provide a temperature sensor to detect the water temperature such that when the water reaches a preset temperature threshold, the temperature sensor triggers the switch to turn off the power of the heating source. However, the major drawback of the temperature sensor is that the temperature sensor cannot be used when the electric kettle is operated at a location with higher altitude. It is known that the water cannot be reached its boiling point at the high altitude location. Therefore, the heating source will keep heating up the water when the water is boiled. In other words, it is unsafe for the user to operate the temperature sensor type electric kettle at the high altitude location. In addition, such temperature sensor has an error that the temperature sensor cannot accuracy detect the actual water temperature. Therefore, the electric kettle may either boil the water without cutting off the power or cut the power without fully boiling the water.

SUMMARY OF THE PRESENT INVENTION

A main object of the present invention is to provide a method of water temperature calibration for an electric kettle, which is adapted to accurately determine the temperature of the boiling water and to cut off the power of the heating source at the same time.

Accordingly, in order to accomplish the above object, the present invention provides a method of water temperature calibration for an electric kettle containing a predetermined volume of water, comprising the steps of:

(a) providing a temperature sensor, a microprocessor, and a control circuit to the electric kettle;

(b) detecting the interior temperature in the electric kettle, wherein the interior temperature is measured by either the water temperature, the temperature of the heating point contacting with the water, or the temperature of the interior wall of a kettle body of the electric kettle;

(c) determining the temperature rate change by the microprocessor and comparing the current cycle of the temperature rate change with the previous cycle of the temperature rate change; and (d) sending out a control signal to the control circuit when the current cycle of the temperature rate change is close to the previous cycle of the temperature rate change that the difference between the current cycle of the temperature rate change and the previous cycle of the temperature rate change is minimized.

According to the preferred embodiment, the cycle of the temperature rate change is preset by the microprocessor.

The cycle is determined by the microprocessor that the microprocessor has an input terminal connecting to a gain resistor of the electric kettle to obtain a value of the heating power thereof, wherein the cycles in responsive to different heating powers are saved in a sorting manner.

When the control circuit receives the control signal from the microprocessor, the control circuit cuts off the power of the heating source to stop heating the water.

The microprocessor processes the interior temperature, which is obtained from either the water temperature, the temperature of the heating point contacting with the water, or the temperature of the interior wall of the kettle body, and compare the current cycle of the interior temperature with the previous cycle of the interior temperature.

The microprocessor processes the water temperature and the temperature rate change thereof for calibration.

The meaning of "the temperature rate change is minimized" is defined the current cycle of rate change of the temperature is relatively small in comparison with the previous cycle of rate change of the temperature. In other words, it means that the difference is the minimum temperature rate change between said current cycle and said previous cycle.

The microprocessor presets a rate change threshold that when the temperature rate change is smaller than the rate change threshold, the microprocessor sends out the control signal to the control circuit.

When the control circuit cuts off the power of the heating source, the microprocessor erases the saved values of all temperature rate change and comparing data.

When the control circuit activates the heating source for heating up the water, the temperature sensor is automatically activated to detect the interior temperature of the electric kettle. When the water temperature, the temperature of the heating point contacting with the water, or the temperature of the interior wall of the kettle body is larger than a preset starting temperature threshold, the microprocessor will start processing the temperature rate change for calibration.

In comparison with the conventional calibration process, the present invention incorporates with the microprocessor to determine the temperature rate change. Accordingly, during the heat up process, the temperature rate change is determined to evaluate whether the water in the electric kettle is boiling or not in order to send the control signal to the control circuit to cut off the power of the heating source. Therefore, the present invention is adapted to accurately determine the temperature of the boiling water in the electric kettle and simultaneously to cut off the heating power when the water is boiled, such that the user is able to use the electric kettle safely.

DETAILED DESCRIPTION OF THE PREFERRED EMBODIMENT

Studies show that the temperature rate change of water is kept changing through the heating process from heating to boiling. At the beginning of the heating process, the temperature change rate of water is stable and is relatively small. When the water is kept being heated up, the temperature rate change of water is increasing and is relative large. When the water is kept being heated up close to its boiling point, the temperature change rate of water is back to stable and is relatively small. The present invention applies such properties of water to calibrate whether the water is boiled in the electric kettle. Accordingly, the present invention provides a method of water temperature calibration for an electric kettle, comprising the following steps.

(1) Provide a temperature sensor, a microprocessor, and a control circuit to the electric kettle.

(2) When the control circuit electrically connects to the heating source, detect the interior temperature in the electric kettle via the temperature sensor, wherein the interior temperature is measured by either the water temperature, the temperature of the heating point of the heating source contacting with the water, or the temperature of the interior wall of a kettle body of the electric kettle.

(3) When the interior temperature reaches a predetermined starting temperature threshold, determine the temperature rate change by the microprocessor and compare the current cycle of the temperature rate change with the previous cycle of the temperature rate change. In other words, the microprocessor compares the current cycle of water temperature with the previous cycle of water temperature and saves as the comparing value.

(4) Send out a control signal to the control circuit when the current cycle of the temperature rate change is close to the previous cycle of the temperature rate change that the difference between the current cycle of the temperature rate change and the previous cycle of the temperature rate change is minimized.

(5) Cut off the power of the heating source to stop heating up the water and return back to the initial state, wherein all the saved values including the temperature rate change and the comparing value are erased from the microprocessor.

The cycle of temperature rate change is preset in the microprocessor. The present invention applies NTC (negative temperature coefficient) heat-variable resistor as the temperature sensor, which is negatively correlated to temperature. The direct current loading on the NTC heat-variable resistor is in responsive to the water temperature, wherein the microprocessor comprises an A/D (analogy to digital) converter converting the signal from the NTC heat-variable resistor into a corresponding digital data. The digital data, which is inversely correlated to the water temperature, denotes the water temperature of the electric kettle. After determining the heating power of the heating source, the input terminal of the microprocessor connects to the voltage-dividing resistor to match with the heating power and to set the cycle of temperature change rate in different values.

The method of determining the temperature rate change comprises the steps of setting the digital data of the current cycle of water temperature as subtrahend, setting the digital data of the previous cycle of water temperature as minuend, determining the difference between the previous cycle of water temperature and the current cycle of water temperature to determine the temperature rate change.

In the heating process, the temperature rate change is in responsive to the heating power, the water capacity of the electric kettle and the water level therein, wherein the heating power and the water capacity are constant. Furthermore, after taking the water level from low to high into account, the temperature rate change becomes constant for the particular electric kettle. A plurality of different voltage-dividing resistors are set at the terminal of the A/D converter of the microprocessor to obtain inquired values for determining the temperature rate change. Therefore, different resistors with different resistances thereof are set at the terminal of the A/D converter of the microprocessor. For safety purpose, the microprocessor presets the lowest temperature rate change threshold such that when the temperature rate change is smaller than the lowest temperature rate change threshold, the microprocessor sends out the control signal to the control circuit to cut off the power of the heating source so as to stop heating up the water.

According to the first embodiment, the electric kettle has a heating power less than 1200 W that the electric kettle is adapted to heat up the water slowly. The electric kettle comprises a NTC (negative temperature coefficient) heat-variable resistor, a microprocessor CPU having multi-path A/D conversion, and the control circuit having a transistor connecting to the input terminal of the microprocessor. When the electric kettle is switched on, the temperature sensor detects the interior temperature of the electric kettle. When the interior temperature is higher than the starting temperature threshold, preferably 55° C., the microprocessor starts to determine the interior temperature and to save the interior temperature and the temperature rate change. Accordingly, the cycle is set as 10 seconds. Therefore, the microprocessor determines the current cycle of the interior temperature in current 10 seconds as subtrahend and the previous cycle of the interior temperature in previous 10 second as minuend. Then, the microprocessor determines the difference between the previous cycle of water temperature and the current cycle of water temperature to determine the temperature rate change. When the temperature rate change is smaller than or equal to 1, the temperature rate change inclines to be flattened. When the lowest value of the current cycle of the temperature rate change is smaller than 1, the microprocessor sends out the control signal to the control circuit to cut off the power of the heating source so as to stop heating up the water. At the same time, the process returns back to its initial state and all the values including the temperature rate change and the intermediate calibrating data determined by the microprocessor are erased.

According to the second embodiment, the electric kettle has a heating power of 3000 W that the electric kettle is adapted to heat up the water rapidly. The electric kettle comprises a NTC (negative temperature coefficient) heat-variable resistor, a microprocessor CPU having multi-path A/D conversion, and the control circuit having a transistor connecting to the input terminal of the microprocessor. When the electric kettle is switched on, the temperature sensor detects the interior temperature of the electric kettle. When the interior temperature is higher than the starting temperature threshold, preferably 66° C., the microprocessor starts to determine the interior temperature and to save the interior temperature and the temperature rate change. Accordingly, the cycle is set as 2 seconds. The microprocessor, through the digital data of the A/D converter, determines the current cycle of the interior temperature in current 2 seconds as subtrahend and the previous cycle of the interior temperature in previous 2 second as minuend. Then, the microprocessor determines the difference between the previous cycle of water temperature and the current cycle of water temperature to determine the temperature rate change. When the temperature rate change is smaller than or equal to 1, the temperature rate change inclines to be flattened. When the lowest value of the current cycle of the temperature rate change is smaller than 1, the microprocessor sends out the control signal to the control circuit to cut off the power of the heating source so as to stop heating up the water. At the same time, the process returns back to its initial state and all the values including the temperature rate change and the intermediate calibrating data determined by the microprocessor are erased.

According to the first embodiment, the electric kettle has a heating power less than 2000 W that the electric kettle is adapted to heat up the water gradually. The electric kettle comprises a NTC (negative temperature coefficient) heat-variable resistor, a microprocessor CPU having multi-path A/D conversion, and the control circuit having a transistor connecting to the input terminal of the microprocessor. When the electric kettle is switched on, the temperature sensor detects the interior temperature of the electric kettle. When the interior temperature is higher than the starting temperature threshold, preferably 60° C., the microprocessor starts to determine the interior temperature and to save the interior temperature and the temperature rate change. Accordingly, the cycle is set as 6 seconds. The microprocessor, through the digital data of the A/D converter, determines the current cycle of the interior temperature in current 6 seconds as subtrahend and the previous cycle of the interior temperature in previous 6 second as minuend. Then, the microprocessor determines the difference between the previous cycle of water temperature and the current cycle of water temperature to determine the temperature rate change. When the temperature rate change is smaller than or equal to 1, the temperature rate change inclines to be flattened. When the lowest value of the current cycle of the temperature rate change is smaller than 1, the microprocessor sends out the control signal to the control circuit to cut off the power of the heating source so as to stop heating up the water. At the same time, the process returns back to its initial state and all the values including the temperature rate change and the intermediate calibrating data determined by the microprocessor are erased.

What is claimed is:

1. A method of calibrating a water temperature for an electric kettle containing a predetermined amount of water, and comprising a temperature sensor, a microprocessor, a control circuit and a heating source defining a heating point for delivering heat energy, wherein said method comprises the steps of:
   (a) controllably heating said water within said electric kettle, and assigning a predetermined interval of heating time as a heating cycle by said microprocessor so as to divide an entire heating time of said electric kettle into a predetermined number of consecutive heating cycles;
   (b) detecting an interior temperature of said kettle by said temperature sensor, wherein said interior temperature of said kettle is defined by one of a temperature of said water contained in said water kettle, a temperature of said heating point of said heating source, or said temperature of an interior wall of said electric kettle;
   (c) when said interior temperature reaches a predetermined a temperature threshold, determining a rate of change of said interior temperature by said microprocessor for each heating cycle;
   (d) for each two consecutive heating cycles, comparing said rate of change of interior temperature of each heating cycle with said rate of change of interior temperature of said subsequent heating cycle by said microprocessor; and
   (e) when said rates of change of interior temperature of two consecutive heating cycles are substantially the same, turning off said heating source by said control circuit to stop heating up said water.

2. The method, as recited in claim 1, wherein said temperature sensor comprises a Negative Temperature Coefficient (NTC) heat-variable resistor which is negatively correlated to detected temperature.

3. The method, as recited in claim 2, wherein said microprocessor comprises an Analogy to Digital (AD) converter converting signal data from said NTC heat-variable resistor into a corresponding digital data, wherein said digital data is inversely correlated to said interior temperature of said electric kettle.

4. The method, as recited in claim 3, wherein in said step (e), said microprocessor is pre-programmed to preset a predetermined threshold of a difference in rate of change of temperature, so that when said actual rate difference of said rate of change of said temperature for one of said heating cycle is smaller than said threshold, said microprocessor is arranged to send out a control signal to said control circuit for stopping said heating of said water.

5. The method, as recited in claim 4, wherein in said step (a) comprises the steps of:
   (a.1) presetting a starting temperature threshold in said microprocessor;
   (a.2) presetting a predetermined interval of heating time as said heating cycle by said microprocessor so as to divide an entire heating time of said electric kettle into a predetermined number of consecutive heating cycles; and
   (a.3) stably heating said water in said electric kettle until said interior temperature reaches said starting temperature threshold.

6. The method, as recited in claim 4, wherein said starting temperature threshold is approximately 55° C.

7. The method, as recited in claim 5, wherein said starting temperature threshold is approximately 55° C.

8. The method, as recited in claim 6, wherein said predetermined time interval defining each of said heating cycle is 10 seconds.

9. The method, as recited in claim 7, wherein said predetermined time interval defining each of said heating cycle is 10 seconds.

10. The method, as recited in claim 4, wherein said starting temperature threshold is approximately 66° C.

11. The method, as recited in claim 5, wherein said starting temperature threshold is approximately 66° C.

12. The method, as recited in claim 10, wherein said predetermined time interval defining each of said heating cycle is 2 seconds.

13. The method, as recited in claim 11, wherein said predetermined time interval defining each of said heating cycle is 2 seconds.

14. The method, as recited in claim 4, wherein said starting temperature threshold is approximately 60° C.

15. The method, as recited in claim 5, wherein said starting temperature threshold is approximately 60° C.

16. The method, as recited in claim 14, wherein said predetermined time interval defining each of said heating cycle is 6 seconds.

17. The method, as recited in claim 15, wherein said predetermined time interval defining each of said heating cycle is 6 seconds.

18. The method, as recited in claim 9, wherein in said step (e), when said difference in rate of change of temperature between said two consecutive heating cycle is smaller than 1, said microprocessor is arranged to stop said heating of said water in said electric kettle.

19. The method, as recited in claim 13, wherein in said step (e), when said difference in rate of change of temperature between said two consecutive heating cycle is smaller than 1, said microprocessor is arranged to stop said heating of said water in said electric kettle.

20. The method, as recited in claim 17, wherein in said step (e), when said difference in rate of change of temperature between said two consecutive heating cycle is smaller than 1, said microprocessor is arranged to stop said heating of said water in said electric kettle.

* * * * *